UNITED STATES PATENT OFFICE.

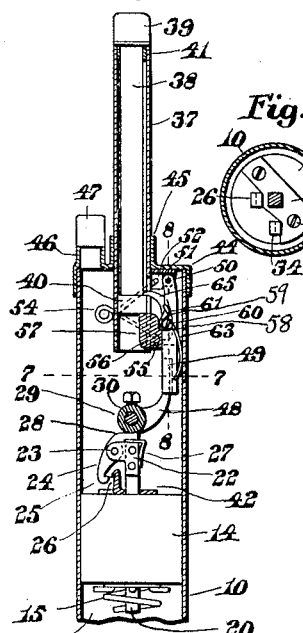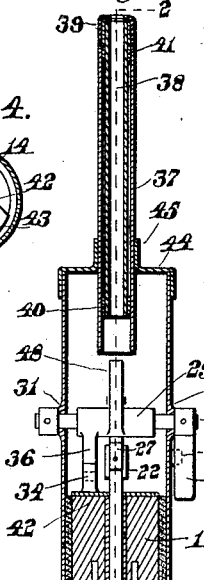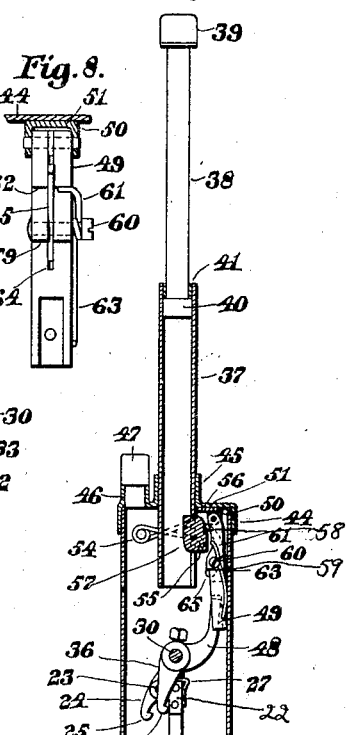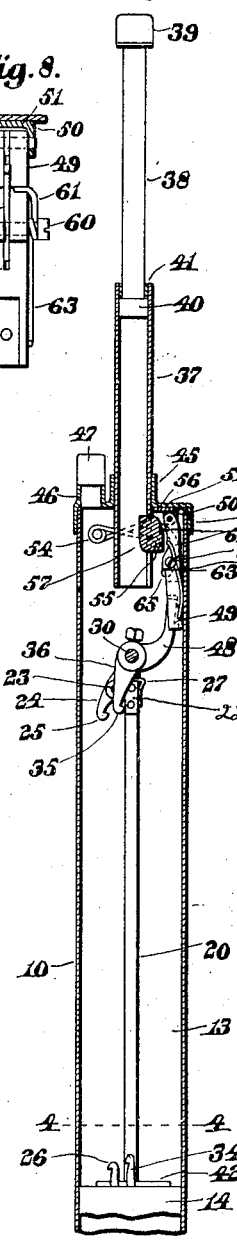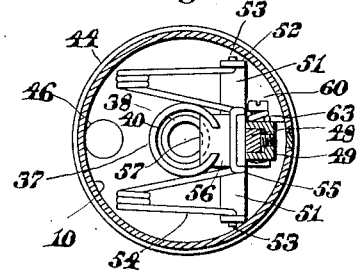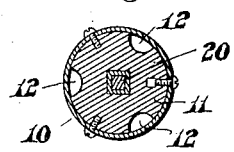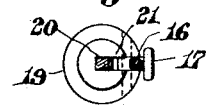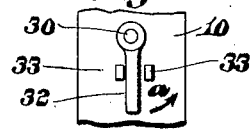

PATRICK H. McGRATH, OF WOLLASTON, MASSACHUSETTS.

FLYCATCHER.

1,329,534.  Specification of Letters Patent.  Patented Feb. 3, 1920.

Application filed June 14, 1919. Serial No. 305,208.

*To all whom it may concern:*

Be it known that I, PATRICK H. MCGRATH, a citizen of the United States of America, and a resident of Wollaston, in the county of Norfolk and Commonwealth of Massachusetts, have invented certain new and useful Improvements in Flycatchers, of which the following is a specification.

This invention relates to fly catchers and has for its object the provision of a device which may be pointed at a fly or similar bug and then actuated to suck the fly into an inclosed chamber from which it can not escape.

The invention consists in certain novel features of construction and arrangement of parts which will be readily understood by reference to the description of the drawings and to the claims to be hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Figure 1 represents a vertical section of a device embodying the principles of the present invention.

Fig. 2 represents a vertical section of the upper end of the same on line 2, 2, on Fig. 1 with the various parts in position to be operated.

Fig. 3 represents a section similar to Fig. 2 and showing the parts in the position assumed after the device has been operated.

Fig. 4 represents a horizontal section on line 4, 4, on Fig. 3.

Fig. 5 represents a horizontal section on line 5, 5, on Fig. 1.

Fig. 6 represents a horizontal section on line 6, 6, on Fig. 1.

Fig. 7 represents an enlarged horizontal section on line 7, 7, on Fig. 2 and looking upward.

Fig. 8 represents an enlarged vertical section on line 8, 8, on Fig. 2, and

Fig. 9 represents a detail to be hereinafter referred to.

Similar characters indicate like parts throughout the several figures of the drawings.

In the drawings, 10 is a tubular handle closed at one end by a cap 11 having peripheral grooves 12 communicating with the chamber 13 within the tubular handle 10. Within said handle 10 is a reciprocating piston 14 and interposed between and coacting with the opposite ends of said cap 11 and piston 14, is a helical pull spring 15 which is expanded when the piston 14 is retained near the end opposite the cap 11. This cap 11 is provided with a hook 16 extending outwardly therefrom which hook is adapted to be engaged by a hook end of a latch 17 pivoted at 18 to a knob 19 secured to a square rod 20 extending through the cap 11 and the piston 14 within the chamber 13. The latch 17 is normally retained in engagement with the hook 16 by means of the spring 21. On the inner end of the rod 20 is secured a bifurcated member 22 in the ears of which is pivoted at 23 a latch member 24, the hook 25 thereof being adapted to engage with a hook 26 extending upwardly from the piston 14.

A spring 27 is adapted to move the latch 24 about its pivot 23 so that the hooks 25 and 26 will engage when the rod 20 has been moved endwise to release the ear 28 from contact with the sleeve 29 secured to and adapted to rock with the oscillating shaft 30. This shaft 30 is mounted in bearings 31 in the tubular handle 10 and secured to one end is a lever or trigger 32 by which said shaft 30 may be rocked about its axis.

The trigger 32 is adapted to move a limited distance between the stops 33 projecting outwardly from the handle 10.

The piston 14 has extending upwardly therefrom, a second hook member 34, the hook of which is normally in engagement with the hooked end 35 of an arm 36 radiating from the sleeve 29.

It is obvious that when the hooks 35 and 34 are in engagement, the piston 14 will be retained near the upper end of the tubular handle 10 with the spring 15 considerably expanded.

The movement of the trigger 32 in the direction of arrow "*a*" on Fig. 9 will release the hook 35 from the hook 34 and the spring 15 will suddenly move the piston toward the cap 11 and create a vacuum in the upper end of the chamber 13 thereby causing an inrush of air through the tubular extension 37.

If a fly or bug was near the mouth of the tubular extension 37, it would be drawn into the chamber 13 by the inrush of air.

After the piston has been thus released and moved toward the cap 11, it is essential that the piston should be returned to its initial position before another operation.

In order to return the piston 14 to its normal position, the latch 17 is disengaged from the hook 16 and by means of the knob 19 the rod 20 is moved outwardly until the hook 25 of the lever 24 engages with the hook 26 of the piston 14.

When these hooks 25 and 26 have been engaged, the operator may force the piston 14 upwardly until the hooks 34 and 35 again become engaged, the spring 15 being expanded during this operation.

As soon as the hooks 34, 35 have become engaged, the ear 28 coming into contact with the sleeve 29 will disconnect the hooks 25 and 26.

Within the tubular projection 37 is positioned a supplemental tube 38 which is provided on its outer end with a buffer member 39. This buffer member 39 is of rubber or some resilient material which will prevent injury to furniture, walls or other articles in which it might possibly come into contact when the device is being operated.

The inner end of the supplemental tube 38 is provided with a collar 40 which, when the said tube is moved outwardly comes into contact with the bushing 41 in the outer end of the tubular projection 37 and limits the outward movement of said supplemental tube 38.

Both of the hooked members 26 and 34 are formed upon a plate 42 secured to the upper end of the piston 14 by means of screws 43.

The peripheral grooves 12 in the cap 11 provide a means for the escape of air from the chamber 13 when the piston 14 is suddenly released and quickly moved by the compression of the spring 15 toward the cap 11.

The upper end of the handle 10 is provided with a perforated end plate 44 having around its central perforation an annular flange 45 to which the tubular projection 37 is secured.

The perforated member 44 is also provided with a flanged opening 46 normally closed by a closure 47. This closure may be removed from the opening 46 to remove the dead insects and bugs from the chamber 13.

The sleeve 29 is provided with an arm 48 the end of which is positioned in a groove in the lower end of the depending member 49 pivoted to ears 50. The ears 50 are formed upon a plate 51 secured to the inner face of the perforated member 44.

The plate 51 is also provided with another pair of ears 52 having openings therein to receive the out-turned ends 53 of a rat-trap spring 54 the central loop 55 of which straddles a sliding grooved block 56, the inner end 57 of which extends into the tubular projection 37.

The inner end of the supplemental tube 38 normally rests upon this inner extension 57 of the block 56. The outer end of the block 56 is provided with a shoulder 58 which is engaged by an inward projection 59 on the pivoted member 49. This member 49 is provided with a headed pin 60 having a spring 61 coiled thereon, one end of which is engaged by a shoulder 62 on the inner face of the depending member 49 while the other and longer end 63 bears against the inner wall of the chamber 13 and normally retains the projection 59 and shoulder 58 in engagement. When in this position the block 56 is prevented from moving upwardly.

When the trigger 32 is actuated to rock the shaft 30 for the purpose of disengaging the hooks 34 and 35, the lever 48 will press against the inner face of the depending member 49 and force it outwardly against the tension of the spring 63 to disengage the shoulders 58 and 59.

As soon as these shoulders 58 and 59 have become disengaged the spring 54 will move the block 56 upwardly with sufficient speed to move the supplemental tube 38 into the position indicated in Fig. 3 of the drawings.

The depending member 49 is provided in its inner face with a slot 64 in which is a curved plate 65 mounted upon the shank of the pin 60 about the axis of which it is adapted to oscillate.

The curved upper end of the plate 65 normally engages the upper end of the collar 40 on the supplemental tube 38 and prevents any accidental outward movement thereof within the tubular projection 37.

When the depending member 49 is moved outwardly to disengage the shoulders 58 and 59, the block 56 will be permitted to move upwardly and force the curved upper end of the plate 65 out of the path of the collar 40 upon the lower end of the supplemental tube 38.

When the parts are in the position shown in Figs. 1 and 2 of the drawings, the block 56 will be in the path of the lower end of the plate 65 and retain the upper end of said plate in the path of the collar 40.

In the operation of the device, the operator grasps the handle 10 and points the tubular projection 37 in the direction of the insect or bug which it is desired to catch, the end of said projection being about five inches therefrom.

He then presses upon the trigger 32 thereby releasing both the piston 14 and the supplemental tube 38.

The supplemental tube 38 will be quickly moved outwardly within the tubular projection 37 and form an extension thereof and at the same time the spring 15 will move the piston 14 suddenly in the opposite direction thereby causing a vacuum within the upper end of the chamber 13 which will produce an inrush of air through the supplemental tube 38 and tubular projection 37.

This inrush will draw the insect through the two tubes into the interior of the handle from which it is impossible for it to escape owing to the injury done to the insect or bug by the impact with the walls of the chamber 13 and the various members located therein.

It is believed that the operation and many advantages of the invention will be thoroughly understood without further description.

Having thus described my invention, I claim—

1. A device of the class described comprising a chambered handle, a piston within said handle, a tubular projection to said handle, means within said handle for suddenly moving said piston away from said tubular projection and creating a vacuum in the chamber of said handle, and a supplemental tube telescoped into said tubular projection and adapted to be moved outwardly therein.

2. A device of the class described comprising a chambered handle, a piston within said handle, a tubular projection to said handle, means within said handle for suddenly moving said piston away from said tubular projection and creating a vacuum in the chamber of said handle, a supplemental tube telescoped into said tubular projection and adapted to be moved outwardly therein, means for retaining said supplemental tube normally within said tubular projection, a spring for forcing said tube outwardly when released, and releasing means for said retaining means.

3. A device of the class described comprising a chambered handle, a piston within said handle, a tubular projection to said handle, means within said handle for suddenly moving said piston away from said tubular projection and creating a vacuum in the chamber of said handle, a supplemental tube telescoped into said tubular projection and adapted to be moved outwardly therein, means for retaining said supplemental tube normally within said tubular projection, a spring for forcing said tube outwardly when released, and a trigger for releasing said retaining means.

4. A device of the class described comprising a chambered handle, a piston within said handle, a tubular projection to said handle, means within said handle for suddenly moving said piston away from said tubular projection, a supplemental tube slidable within said tubular projection, means for retaining said tube normally within said tubular projection, means for normally retaining said piston near said tubular projection, and means for simultaneously releasing said piston and tube.

5. A device of the class described comprising a chambered handle, a piston within said handle, a tubular projection from one end of said handle, a cap for the opposite end of said handle, a spring interposed between and connected at opposite ends to said cap and piston, means for normally retaining said piston near said tubular projection with said spring extended, and means for releasing said piston.

6. A device of the class described comprising a chambered handle, a piston within said handle, a tubular projection from one end of said handle, a cap for the opposite end of said handle, a spring interposed between and connected at opposite ends to said cap and piston, means for normally retaining said piston near said tubular projection with said spring extended, means for releasing said piston, and means for returning said piston to its normal position.

7. A device of the class described comprising a chambered handle, a piston within said handle, a tubular projection from one end of said handle, a cap for the opposite end of said handle, a spring interposed between and connected at opposite ends to said cap and piston, means for normally retaining said piston near said tubular projection with said spring extended, means for releasing said piston, a slidable rod extending through said cap, a hook on said cap, a pivoted latch carried by the outer end of said rod and adapted to engage said hook, a latch pivoted to the inner end of said rod and a hook on said piston adapted to coact with the latch on the inner end of said rod.

8. A device of the class described comprising a chambered handle, a piston within said handle, a tubular projection from one end of said handle, a cap for the opposite end of said handle, a spring interposed between and connected at opposite ends to said cap and piston, means for normally retaining said piston near said tubular projection with said spring extended, means for releasing said piston, a slidable rod extending through said cap, a hook on said cap, a pivoted latch carried by the outer end of said rod and adapted to engage said hook, a latch pivoted to the inner end of said rod and a hook on said piston adapted to coact with the latch on the inner end of said rod, and means for releasing said latch on the inner end of rod from the piston hook when the piston has been returned to its normal position.

9. A device of the class described comprising a chambered handle, a piston within said handle, a tubular projection from one end of said handle, a spring interposed between said piston and cap and connected thereto, a hook on said piston, a rocker shaft, a hooked arm thereon normally coacting with said piston hook, and means for oscillating said shaft.

10. A device of the class described, comprising a chambered handle, means for creating a vacuum therein, a tubular projection to said handle, a supplemental tube slidable therein, a spring for suddenly forcing said supplemental tube outwardly, means for normally compressing said spring, and a releasing device for said spring.

11. A device of the class described, comprising a chambered handle, means for creating a vacuum therein, a tubular projection to said handle, a supplemental tube slidable therein, means for normally retaining said supplemental tube within said tubular projection, a spring for suddenly forcing said supplemental tube outwardly, means for normally retaining said spring under compression, and a releasing device for said retaining means.

12. A device of the class described, comprising a chambered handle, a supplemental tube slidable therein, a pivoted finger for normally retaining said supplemental tube within said tubular projection, a spring for suddenly forcing said supplemental tube outwardly, means for normally retaining said spring under compression and a releasing device for said retaining means.

13. A device of the class described, comprising a chambered handle, means for creating a vacuum therein, a tubular projection to said handle having a slot in its inner end, a supplemental tube slidable within said tubular projection, a block slidable in said slot on the upper face of which said supplemental tube normally rests, and a spring member normally compressed but adapted to be released to impart a quick outward movement to said block.

14. A device of the class described, comprising a chambered handle, means for creating a vacuum therein, a tubular projection to said handle having a slot in its inner end, a supplemental tube slidable within said tubular projection, a block slidable in said slot on the upper face of which said supplemental tube normally rests, a spring coacting with said block and adapted to impart a quick outward movement to said block, a depending pivoted member provided with a projecting shoulder coacting with a shoulder on said block to normally retain said spring under compression, and means for disengaging said shoulders.

15. A device of the class described, comprising a chambered handle, means for creating a vacuum therein, a tubular projection to said handle having a slot in its inner end, a supplemental tube slidable within said tubular projection, a block slidable in said slot on the upper face of which said supplemental tube normally rests, a spring coacting with said block and adapted to impart a quick outward movement to said block, a depending pivoted member provided with a projecting shoulder coacting with a shoulder on said block to normally retain said spring under compression, a rocker shaft, an operating trigger therefor, and an arm on said shaft coacting with said depending member and adapted to move said depending member outwardly to disengage said shoulders.

Signed by me at 4 Post Office Square, Boston, Mass., this 12th day of June, 1919.

PATRICK H. McGRATH.

Witnesses:
WALTER E. LOMBARD,
NATHAN C. LOMBARD.